April 25, 1939.  W. S. WATTS  2,156,135
CLUTCH CONTROL MECHANISM
Original Filed Oct. 20, 1933
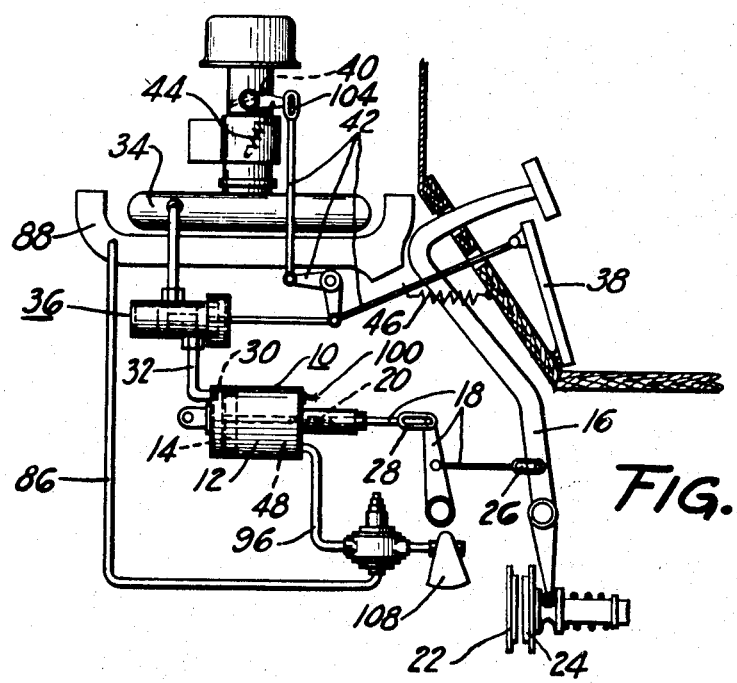
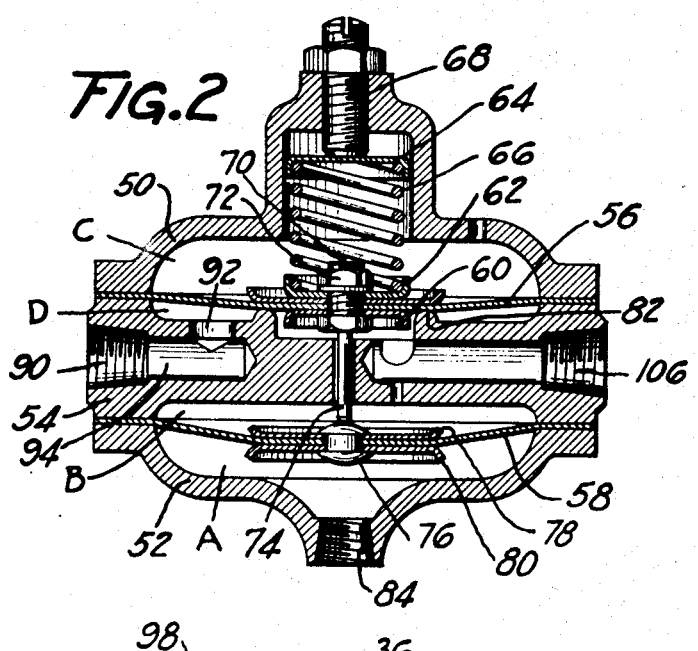
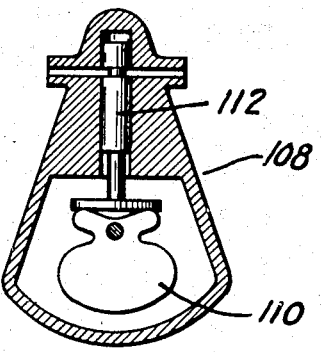
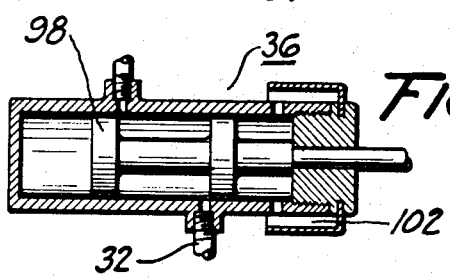
INVENTOR.
WILLIAM S. WATTS
BY
H. O. Clayton
ATTORNEYS.

Patented Apr. 25, 1939

2,156,135

UNITED STATES PATENT OFFICE 2,156,135

CLUTCH CONTROL MECHANISM

William S. Watts, South Bend, Ind., assignor to Bendix Aviation Corporation, South Bend, Ind., a corporation of Delaware Original application October 20, 1933, Serial No. 694,437. Divided and this application December 30, 1936, Serial No. 118,368

6 Claims. (Cl. 192—.01)

This invention relates in general to power operated clutch control mechanism for an automotive vehicle, and in particular to means for regulating the clutch engaging operation of the mechanism.

This invention is directed to the improvement of the so-called automatic clutch of the present day, wherein the throttle operating means of the vehicle controls the valve mechanism of a manifold vacuum operated motor operably connected to the clutch. In this type of mechanism the power element of the clutch motor is subjected to a varying differential pressure to regulate the disengagement and engagement of the clutch.

One of the well-known commercial types of clutch motors or clutch operators comprises a double-ended cylinder housing a reciprocable piston operably connected to the clutch pedal, wherein there is provided a three-way valve or so-called dump valve constituting part of the aforementioned control valve mechanism. The control valve is preferably operated by the accelerator in such manner as to alternately connect one end of the cylinder with the intake manifold of the engine and to the atmosphere to thereby initiate the clutch disengaging and engaging operations of the motor. Other valve means are provided for controlling the efflux of air from the other end of the cylinder to vary the loading of the clutch plates. One feature of the present invention is directed to the construction and mode of operation of the latter valve means.

To this end there is provided a pressure differential operated bleed valve incorporated in the vent from the last-mentioned end of the cylinder, the valve and the means for operating the same being so constructed and so interconnected with the engine of the vehicle as to operate in accordance with the degree of pressure within the exhaust manifold. This is an important feature, since heretofore the bleed valve has been operated by means, such for example as the manifold vacuum, which is subject to extraneous variables resulting in undesirable fluctuation of the valve. The prior art relating to controlling means for the bleed valve does not suggest clutch operating mechanism including a valve structure such as disclosed by the instant invention, wherein the mechanism provides for a loading of the clutch plates to engage the clutch in such a manner that the loading is proportional to the engine torque.

Yet another object of the invention is to provide a pressure differential actuated clutch operator, wherein the throttle operating means of the vehicle serves as a common control means for the throttle and the control valve mechanism of the clutch operator. To this end there is provided a valve mechanism comprising a three-way or dump valve for initiating the clutch disengaging and engaging operations of the clutch operator, the said valve mechanism being controlled by the operation of the throttle. In the embodiment disclosed, there is also provided the bleed valve referred to above, the same comprising a power operated relay valve of the balanced type to provide a follow-up control of the clutch operator in effecting its clutch engaging operation.

Other objects of the invention and desirable details of construction and combinations of parts will become apparent from the following description of a preferred embodiment, which description is taken in conjunction with the accompanying drawing, in which:

Figure 1 is a diagrammatic view of a preferred embodiment of the clutch control mechanism constituting the present invention;

Figure 2 is a sectional view of the bleed valve mechanism of Figure 1;

Figure 3 is an enlarged sectional view of the inertia operated valve of Figure 1; and Figure 4 is an enlarged sectional view of the three-way valve mechanism of Figure 1.

Referring now to the preferred embodiment of the invention disclosed diagrammatically in Figure 1, there is provided a clutch motor 10 comprising a double-ended cylinder 12, preferably pivotally mounted to a fixed portion of the vehicle, said cylinder housing a reciprocable piston 14 constituting the power element of the motor and operably connected to a clutch pedal 16 by linkage 18: said linkage includes a connecting rod slotted at 20 for a purpose to be described hereinafter. The clutch pedal serves to operate a conventional clutch comprising driving and driven plates 22 and 24 respectively. Pin and slot lost motion connections 26 and 28 provide a means, together with the power mechanism and clutch pedal, whereby the clutch may be operated either manually or by power, the slot 26 providing a means whereby the clutch pedal may be depressed without affecting the power means. A left compartment 30 of the cylinder 12 is alternately evacuated and vented to successively disengage the clutch and initiate an engagement thereof by means of a conduit 32 connecting the clutch motor with the atmosphere and with an intake manifold 34 of an internal-combustion engine, not shown, a three-way valve 36 being incorporated in the conduit to effect the aforementioned control. The valve 36 is arranged to be operated by an accelerator 38, the latter also operating a throttle valve 40 of the engine, a linkage 42 interconnecting these parts. Springs 44 and 46 serve to return the throttle valve 40 and accelerator 38 to their respective "off" positions upon release of the accelerator. No claim is made to the aforementioned construction, for the same is disclosed and claimed in the patent to Ross I. Belcia, No. 1,470,272, dated October 9, 1923.

The invention is directed to valve means, and particularly to means for controlling the valve means, said latter means serving to regulate the efflux of air from a right compartment 48 of the cylinder 12 to thereby control the engagement of the clutch. This valve structure is disclosed in detail in Figure 2 and includes a casing comprising interconnected end members 50 and 52 and a central member 54, the three members housing diaphragm members 56 and 58 secured in position by the peripheral edges of the casing members and providing power fluid receiving chambers A, B, C and D. To the center of the diaphragm 56 is secured cup-shaped washers or retainers 60 and 62, the latter, together with a washer 64, serving to house a spring member 66. The member 64 is engaged by an adjustable stop member 68 mounted in the end of the casing member 50. The stop member 68 serves to vary the compression of the spring 66. The diaphragm 56 and retainer members 60 and 62 are clamped together by a bolt 70 and a nut 72, and a thrust pin 74, screw-threaded into the bolt 70, is adapted to disconnectedly engage a rivet 76, the latter serving as a means for securing reenforcing members 78 and 80 to the center of the diaphragm 58. The diaphragm 56 is normally seated, with the engine idling, upon an annularly raised portion or land 82 integral with the casing member 54, that portion of the diaphragm 56 contacting the land, together with the land, constituting a bleed or blow-off valve, referred to in greater detail hereinafter.

To a port 84 in the casing member there is secured one end of a conduit 86, the other end of the same being connected to the exhaust manifold 88, thus placing the chamber A of the valve mechanism in fluid transmitting connection with the exhaust manifold. The compartment D of the valve mechanism is connected, via port 90 and ducts 92 and 94 in the casing section 54, with the end compartment 48 of the cylinder 12 by means of a conduit 96.

Referring now to the operation of the above-described mechanism, with release of the accelerator the throttle is closed to idle the engine, thereby producing, by virtue of the pumping action of the engine pistons, a manifold vacuum of some twenty inches of mercury at sea level. The three-way valve 36 is, with the release of the accelerator, operated to intercommunicate the manifold with the left compartment 30 of the cylinder 12, a spool member 98 of the three-way valve being moved to the right, Figure 4, to effect this connection. The compartment 30 is accordingly partially evacuated, the atmosphere acting upon the right side of the piston 14, and entering the cylinder via an inwardly opening check valve 100, serving to move the piston to the left as disclosed in Figure 1 to disengage the clutch.

When it is desired to engage the clutch either to start the vehicle, or after a gear shifting operation, or possibly after a free-wheeling operation, the accelerator is depressed to move the valve member 98 to the left, closing off the connection with the manifold and venting the compartment 30 to the atmosphere via atmospheric ports 102 in the valve 36. The throttle is, of course, also open with the depression of the accelerator, however preferably after the valve member 98 has been moved to vent the cylinder, there being provided a lost motion connection 104 in the throttle linkage to accomplish this end. With the venting of the compartment 30 the conventional clutch springs, not shown, immediately act to engage the clutch, the mode of engagement being determined by the mode of efflux of air from the right compartment 48 of the cylinder 12. The air from the compartment passes rapidly from the cylinder via the slot 20, effecting a relatively rapid movement of the clutch pedal to take up the clearance between the clutch plates. When the piston 14 and connecting rod have moved to such a position that the slot 20 is either covered by the end wall of the cylinder or lies beyond said wall outside the cylinder, air may no longer pass from the cylinder via the slot; the air, however, continues to rapidly flow from the compartment 48, via the conduit 96, ducts 94 and 92 in the casing member 54, thence into the chamber D and through the bleed valve, which is at this time slightly open owing to the super-atmospheric pressure in the chamber, and out to the atmosphere via a duct 106 in the casing member 54. The spring 66 is of such strength as to be compressed by the escaping air to open the bleed valve, said valve remaining open however only until the clutch plates have contacted with a predetermined relatively slight load. When this occurs the relatively high gaseous pressure within the compartment 48 of the cylinder automatically drops to an amount substantially above the pressure of the atmosphere and the spring 66 automatically acts to seat the bleed valve, this operation being known in the art as a lapping of the valve. Thus whenever the clutch is engaged, the plates are always initially loaded to a predetermined amount irrespective of the worn-in condition of the clutch facings, said loading depending upon the proportioning of the parts and the strength of the clutch spring and spring 66.

The above-described operation preferably takes place during the taking up of the lost motion at 104 and prior to the opening of the throttle, parts of the mechanism being adjusted to effect this result. With a continued depression of the accelerator, the throttle is opened to speed up the engine, resulting in an increase in the gaseous pressure within the exhaust manifold and a corresponding increase in the gaseous pressure in the chamber A acting on the diaphragm 58. This pressure, together with the super-atmospheric pressure acting on the lower side of the diaphragm 56 in chamber D, acts to again crack the bleed valve, that is unseat the diaphragm 56, permitting a limited amount of air to escape from compartment 48. This may be described as a "blow-off" action of the valve, effecting a slight "blowing down" of the clutch motor. The diaphragm 56, however, once unseated acts almost immediately thereafter to seat again, the action being very fast, for the pressure developed by the gas within the exhaust manifold, and incidentally in chamber A, is insufficient of itself to overcome the spring 66 once the gaseous pressure of the air in chamber D is reduced by the above-described blow-off action of the bleed valve. With the escape of a limited quantity of air from the compartment 48 of the cylinder, the loading of the clutch plates is correspondingly increased by a predetermined amount in pounds.

Now, if the throttle is further operated, the above cycle of operations is repeated, the loading of the clutch plates being increased by the action of the clutch springs until the system is again in equilibrium, that is when the bleed valve is reseated. It will be noted that as the gaseous pressure in chamber A increases the absolute pressure within the compartment 48 and chamber D proportionately decreases, for with each successive increment of load placed upon the clutch plates by the clutch springs the last-mentioned pressure must necessarily be decreased in proportion. In other words, the sum of the forces acting to unseat the diaphragm 56 and resulting from the additive effect of the pressures in the chambers A and D is substantially equal to the force exerted by the spring 66 when the system is in equilibrium and the bleed valve is seated, and the pressure in chamber D decreases proportionately with the increase in pressure in chamber A. Furthermore, in order to unseat the bleed valve the pressure in chamber A must be increased so that the force resulting from the sum of the pressures in chambers A and D exceeds the force exerted by the spring 66, for it will be obvious that the maximum pressure developed in either chamber A or D is insufficient of itself to unseat the valve. It therefore follows that the force exerted by the clutch springs at any given instant after the clutch plates have contacted is directly proportional to the pressure in the chamber A, and therefore directly proportional to the exhaust manifold pressure developed by the engine. This, however, is exactly the end desired, for the loading of the clutch should be regulated in accordance with the speed of the engine, and the resultant torque of the engine driven clutch plate or flywheel to effect the desired smooth engagement of the clutch and also obviate any possible stalling of the engine.

With the above-described mechanism there is provided in a relatively simple fluid operated clutch operator or so-called automatic clutch the principal advantages of the more complicated centrifugal clutch of the day. Furthermore, it should be noted that the balanced valve mechanism suggested provides the much desired follow-up to-lap type of control of the clutch motor.

The valve mechanism of Figure 3 embodies an additional feature in providing an inertia operated means 108 for automatically controlling the clutch engaging operation of the clutch motor to limit the acceleration of the vehicle to a predetermined maximum. Describing this phase of the operation, the mass of a pivotally mounted weight 110 is so determined as to automatically effect a closing of a valve 112, when and if the acceleration or deceleration of the vehicle exceeds a predetermined factor, which is preferably slightly below that which would be objectionable to the passengers, that is below that producing a noticeable jerking action of the vehicle. The developed acceleration or deceleration is, of course, among other features a function of the clutch plate loading, the engine torque, the weight of the vehicle and the wind and traction resistance. Thus should the acceleration or deceleration exceed the aforementioned maximum, the valve 112 will automatically close, trapping the air in the chamber D and compartment 48, and maintain the then existing clutch loading until the acceleration or deceleration is reduced sufficiently to return the weight 110 to its normal position. This inertia action is extremely delicate and rapid in its action, and in practice it has been found that all objectionable jerking of the vehicle is eliminated by the disclosed device.

The invention heretofore described is disclosed in my copending application Serial No. 694,437, filed October 20, 1933, this application constituting a division thereof.

While one illustrative embodiment has been described, it is not my intention to limit the scope of the invention to that particular embodiment, or otherwise than by the terms of the appended claims.

I claim:

1. In a clutch control mechanism for an automotive vehicle provided with an exhaust manifold and a clutch, a pressure differential operated motor operably connected with the clutch, and control valve mechanism for said motor comprising valve means for controlling the clutch engaging operation of said motor, said valve means being operative in accordance with the gaseous pressure of said exhaust manifold.

2. In a clutch control mechanism for an automotive vehicle provided with an exhaust manifold and a clutch, a pressure differential operated motor operably connected with the clutch, and control valve mechanism for said motor comprising a pressure sensitive valve, fluid transmitting means interconnecting said valve and manifold, and other fluid transmitting means interconnecting said valve and motor.

3. In a clutch control mechanism for an automotive vehicle provided with an exhaust manifold and a clutch, a pressure differential operated motor operably connected with the clutch, and control valve mechanism for said motor comprising a pressure sensitive valve, fluid transmitting means interconnecting said valve and manifold, and other fluid transmitting means interconnecting said valve and motor, said control valve mechanism further comprising a valve operative to initiate the clutch disengaging and engaging operations of said motor.

4. In a clutch control mechanism for an automotive vehicle provided with an exhaust manifold, an accelerator and a clutch, a double-ended pressure differential operated motor operably connected with the clutch, and control valve mechanism for said motor comprising a pressure sensitive valve, fluid transmitting means interconnecting said valve and manifold, and other fluid transmitting means interconnecting said valve with one of the compartments of said motor, said control valve mechanism further comprising a valve operative to initiate the clutch disengaging and engaging operations of said motor.

5. In a clutch control mechanism for an automotive vehicle provided with an exhaust manifold, a bleed valve mechanism comprising a power fluid receiving chamber adapted to be placed in fluid transmitting connection with a pressure differential operated motor, another power fluid receiving chamber, fluid transmitting means interconnecting said latter chamber with the exhaust manifold, and movable valve means operable in accordance with the pressure within the last-mentioned chamber.

6. A clutch control mechanism for an automotive vehicle provided with an exhaust manifold comprising a casing having three sections, two diaphragm members interposed between said sections, yieldable means positioned between one of said diaphragm members and one of said casing members, and valve means formed on one of said casing members, said valve means cooperating with one of the diaphragm members to provide a blow-off valve.

WILLIAM S. WATTS.